US009602188B2

(12) United States Patent
Behrens et al.

(10) Patent No.: US 9,602,188 B2
(45) Date of Patent: Mar. 21, 2017

(54) SUPPORT SYSTEM

(75) Inventors: Joerg Behrens, Bremen (DE); Birgit Suhr, Bremen (DE); Lars-Christian Hauer, Bremen (DE)

(73) Assignee: Deutsches Zentrum fuer Luft- und Raumfahrt e.V., Cologne (DE)

( * ) Notice: Subject to any disclaimer, the term of this patent is extended or adjusted under 35 U.S.C. 154(b) by 373 days.

(21) Appl. No.: 14/344,614

(22) PCT Filed: Sep. 14, 2012

(86) PCT No.: PCT/EP2012/068094
§ 371 (c)(1),
(2), (4) Date: Apr. 10, 2014

(87) PCT Pub. No.: WO2013/037954
PCT Pub. Date: Mar. 21, 2013

(65) Prior Publication Data
US 2014/0218232 A1    Aug. 7, 2014

(30) Foreign Application Priority Data
Sep. 14, 2011   (DE) .................. 10 2011 113 153

(51) Int. Cl.
*H04B 7/185*  (2006.01)
*G08G 3/00*  (2006.01)
(Continued)

(52) U.S. Cl.
CPC .......... *H04B 7/18517* (2013.01); *G08G 3/00* (2013.01); *G08G 3/02* (2013.01); *H04B 7/185* (2013.01)

(58) Field of Classification Search
CPC ... G08G 3/00; G08G 3/02; H04B 7/14; H04B 7/15; H04B 7/185; H04B 7/1851;
(Continued)

(56) References Cited

U.S. PATENT DOCUMENTS 7,286,914 B2 * 10/2007 Cerchione ................ G08G 3/00
340/989
7,809,370 B2 * 10/2010 Stolte .................. H04B 7/18513
455/427

(Continued)

FOREIGN PATENT DOCUMENTS

FR          2943480 A1 * 9/2010  .......... H04B 7/1851
WO       03/046603          6/2003
(Continued)

OTHER PUBLICATIONS

Cervera et al.; "On the Performance Analysis of a Satellite-Based AIS System"; 10th International Workshop on Signal Processing for Space Communications, Piscataway NJ, Oct. 6, 2008, pp. 1-8.

*Primary Examiner* — Bernarr Gregory
(74) *Attorney, Agent, or Firm* — Whitham, Curtis & Cook, P.C.

(57)   ABSTRACT

A support system (1) for traffic support of ships (20a, 20b, 21a, 21b), having AIS ship reception units for receiving AIS radio signals containing ship traffic data, is characterized in that at least one flight object (2) is provided, comprising at least one AIS flight transmission unit (3), which is designed to transmit AIS radio signals containing ship traffic data inside an AIS transmission range (10) in such a manner that the transmitted AIS radio signals can be received by the ships (20a, 20b, 21a, 21b) located inside the AIS transmission range (10) by means of their respective AIS ship reception units.

11 Claims, 2 Drawing Sheets

(51) Int. Cl.
*G08G 3/02* (2006.01)
*H04B 7/00* (2006.01)

(58) Field of Classification Search
CPC . H04B 7/18517; H04B 7/18513; G01C 21/00
See application file for complete search history.

(56) References Cited

U.S. PATENT DOCUMENTS

| | | | |
|---|---|---|---|
| 2005/0038596 A1* | 2/2005 | Yang | G01C 21/00 |
| | | | 701/532 |
| 2008/0086267 A1 | 4/2008 | Stolte et al. | |
| 2010/0033363 A1* | 2/2010 | Lee | G08G 3/02 |
| | | | 342/41 |

FOREIGN PATENT DOCUMENTS

| | | | | |
|---|---|---|---|---|
| WO | 2007/143478 | 12/2007 | | |
| WO | 2008-148188 | 12/2008 | | |
| WO | WO2010/040858 A2 * | 4/2010 | | G08G 3/02 |

* cited by examiner

SUPPORT SYSTEM

FIELD OF THE INVENTION

The invention relates to a support system for traffic support for ships that have AIS ship reception units for receiving AIS radio signals containing shipping traffic data. The invention likewise relates to a method for traffic support for ships having such AIS ship reception units.

BACKGROUND

Since the year 2000, the AIS (Automatic Identification System) has been stipulated as an obligatory standard by the International Maritime Organization (IMO) in order to increase the safety of international shipping traffic. This locally bounded radio system is used in this case for the interchange of navigation and other shipping data that are meant to allow the ships to obtain a comprehensive overview of the adjacent shipping traffic. The primary aim in this case is to avoid collisions between ships.

The individual ships use an AIS transponder arranged on the ships to transit their own shipping data using the broadcast method, said shipping data then being able to be received by the adjacent ships. The reception of shipping data from various ships in the surroundings of a ship therefore allows an overview of the adjacent shipping traffic to be derived, so that, by way of example, a ship is able to establish in what direction and at what speed adjacent ships, which are invisible on account of poor visibility conditions, for example, are traveling.

AIS is designed such that it alternately transmits on two channels in the VHF marine radio band, namely firstly on 161.975 MHz and secondly on 162.025 MHz. In this case, the individual AIS shipping data items are transmitted in fixed time frames, the use of which is automatically coordinated by the relevant subscribers (what is known as SOTDMA: Self organized time division multiple access).

Hence, there are just 2250 time slots per minute available to the individual subscribers for transmitting data.

In this case, the radio range of AIS from ship to ship is approximately 20 to 30 nautical miles, which corresponds to little more than normal visibility on the high sea. Although coastal stations can cover a radius of up to 100 km on account of their relatively high position, such coastal stations can be found only in highly frequented areas, in which maintaining such a coastal station is worthwhile from economic aspects.

On the basis of the limited visibility and also the SOTDMA transmission protocol that is used, those ships that are able to see and receive one another form an AIS radio cell within which the subscribers can send and receive without collision. In this case, the subscribers in the AIS radio cell negotiate their use of the available time slots so that collision-free interchange of the data is made possible. Hence, the AIS is merely a local radio system that, although it provides sufficient data for a ship on the high sea, appears to be little suited as a superordinate communication means.

Accordingly, AIS coastal stations can be used to transmit messages to the ships using AIS radio signals only within a short coastal range. Outside these regions or in areas in which such AIS coastal stations are not worthwhile on a geopolitical basis or for economic reasons, transmission of messages to the ships is possible only to a limited extent. Thus, although some ships can receive data using communication means, such as Iridium or INMARSAT C, both the purchase of these communication appliances and the use thereof are very costly, which means that this communication path is suitable only for emergencies.

SUMMARY

It is therefore an object of the present invention to specify an improved system that can be used to transmit messages, data or information even to ships on the high sea without this requiring the entire international shipping traffic to be equipped with new communication means.

The invention achieves the object by means of the support system of the type cited at the outset in that at least one flying object is provided that at least one AIS flying transmission unit that is set up to transmit AIS radio signals containing shipping traffic data within an AIS transmission range such that the transmitted AIS radio signals can be received by the ships situated within the AIS transmission range by virtue of the respective AIS ship reception units of said ships.

The invention therefore proposes that the monitoring system has at least one flying object on which at least one AIS flying transmission unit is arranged. The AIS flying transmission unit is set up to transmit AIS radio signals within an AIS transmission range, specifically such that the AIS radio signals transmitted to the transmission range are able to be received by the AIS ship reception units that are arranged on the ships when the ships are situated within the transmission range of the AIS flying transmission unit arranged on the flying object.

Flying objects within the meaning of the present invention are advantageously satellites or aircraft having very high cruise altitudes, such as commercial aircraft, which usually fly above 3000 meters.

On account of the enormous height of the AIS flying transmission unit, it becomes possible to transmit shipping traffic data to a large number of ships using the AIS, since the height means that a very large transmission range that is proportional to the height is obtained. On account of the large transmission range, it is thus possible to address a large number of ships in a wide variety of AIS radio cells without this requiring additional communication means on the ship. This is because ships having a gross tonnage of over 300 registered tons are today obliged to carry an AIS transponder and a corresponding AIS reception unit as standard.

By way of example, it is thus possible for up-to-date traffic data, environmental data, such as visibilities, wind values or water levels, territory data, such as in the case of excavation and sounding work, shipping movements from anchorages, etc., and also weather information, such as the air and water temperature, wind speed and the like, to be simultaneously transmitted to a large number of ships that are situated outside the conventional and standard monitoring systems such as radar or coastal AIS. Hence, the AIS is no longer used just to transmit information concerning the first-party ship from ship to ship, but rather is used to transmit superordinate information about the traffic, weather or territory situation, which can then be received and evaluated by the ships in the transmission range.

This significantly increases the consciousness of situation and position for the individual ships even in travel areas that provide only few available sources of information a long way from civilization.

A communication unit arranged on the flying object is used to transmit appropriate shipping traffic data from a ground station, for example, to the flying object so that said data can then be forwarded to the ships using the AIS. The central management in a ground station allows various data sources or information sources to be tapped for the provision of the shipping traffic data. The communication unit on the flying object and the corresponding unit on the ground station can then be used, even with the interposition of intermediate stations, to transmit these shipping traffic data provided in the ground station to the ships using the AIS flying transmission unit.

Advantageously, the support system has at least one data selection unit that is set up to select shipping traffic data to be transmitted on the basis of a position of the AIS transmission range of the at least one AIS flying transmission unit. This allows shipping traffic data relating to the current transmission range to be transmitted specifically to the ships situated in this transmission range using the AIS, so that quite specifically dedicated AIS messages can be transmitted to the ships. The shipping traffic data that do not affect this current transmission range are filtered out in this case.

Alternatively, it is conceivable for the data selection unit to be designed to select transmitted shipping traffic data on the basis of a priority of the stored shipping traffic data. This allows marine emergency messages, for example, to be transmitted with priority to a large number of ships, which can then independently decide how they deal with the marine emergency.

Furthermore, it is quite particularly advantageous if at least one flying object, besides the AIS flying transmission unit, additionally has an AIS flying reception unit that is set up to receive AIS radio signals within an AIS reception range. Preferably the AIS reception range is congruent with the AIS transmission range. The support system now furthermore has a data processing unit that is set up to extract from the received AIS radio signals the shipping traffic data contained in said AIS radio signals and to select shipping traffic data to be transmitted from a multiplicity of shipping traffic data stored in a data buffer store on the basis of the extracted shipping traffic data, as a result of which the AIS flying transmission unit can transmit appropriate AIS radio signals that contain at least the shipping traffic data selected by the data processing unit. By way of example, this makes it possible to take received position reports and directions of travel, which the AIS radio signals contain as shipping traffic data, as a basis for performing appropriate advanced calculations, on the basis of which it is then possible to transmit early warnings or other traffic data to the ships, for example. It is thus conceivable for weather warnings or warnings about shallows, icebergs or pirates to be output on the basis of the position and the direction of travel of the ships, for example.

Both the data selection unit and the data processing unit can be arranged directly on the flying object in order to process the data directly in situ. Alternatively, it is conceivable for the data selection unit or data processing unit to be arranged on the ground station and then for just appropriate selected shipping traffic data to be transmitted via the communication path between ground station and flying object.

In addition, it is quite particularly advantageous if an AIS encryption unit is provided for encrypting at least a portion of the shipping traffic data to be transmitted, as a result of which it is possible for safety-relevant data to be transmitted to the ships, said data being able to be deciphered only by a particular portion of the ships. It is therefore possible for particular information to be transmitted to selected ships specifically.

Furthermore, it is extremely advantageous if the at least one flying object has a reception unit that is designed to receive a confirmation message that has been transmitted by a ship following reception of an AIS message addressed to the ship. For example, it is thus conceivable for specific AIS messages containing AIS shipping traffic data that are directed only to a specific or selected ship to be transmitted via the AIS flying transmission unit, for example by means of encryption or appropriate ID addressing. Once the ship has received this specific AIS message, it can return a confirmation message that can then be received by the flying object. It is therefore possible to ensure that this message addressed to the selected ship has also actually been received thereby. By way of example, this confirmation message can then be returned to the ground station via the communication path.

Furthermore, it is particularly advantageous if the support system has a plurality of flying objects that each have at least one AIS flying transmission unit. The AIS transmission ranges defined by the respective AIS flying transmission units then in total form a large common AIS transmission range in which it is then possible for shipping traffic data to be transmitted to the affected ships. Hence, it is possible to reach a substantially larger coverage area.

The invention otherwise also achieves the invention by means of the method of the type cited at the outset by virtue of transmission of AIS flying signals containing shipping traffic data by an AIS flying transmission unit arranged on a flying object within an AIS transmission range such that the transmitted AIS radio signals can be received by the ships situated within the AIS transmission range by virtue of the respective AIS ship reception units of said ships.

Advantageous embodiments of the method can be found in the relevant subclaims.

BRIEF DESCRIPTION OF THE DRAWINGS

The invention is explained in more detail by way of example with reference to the appended figures, in which.

DETAILED DESCRIPTION

Figure 1:
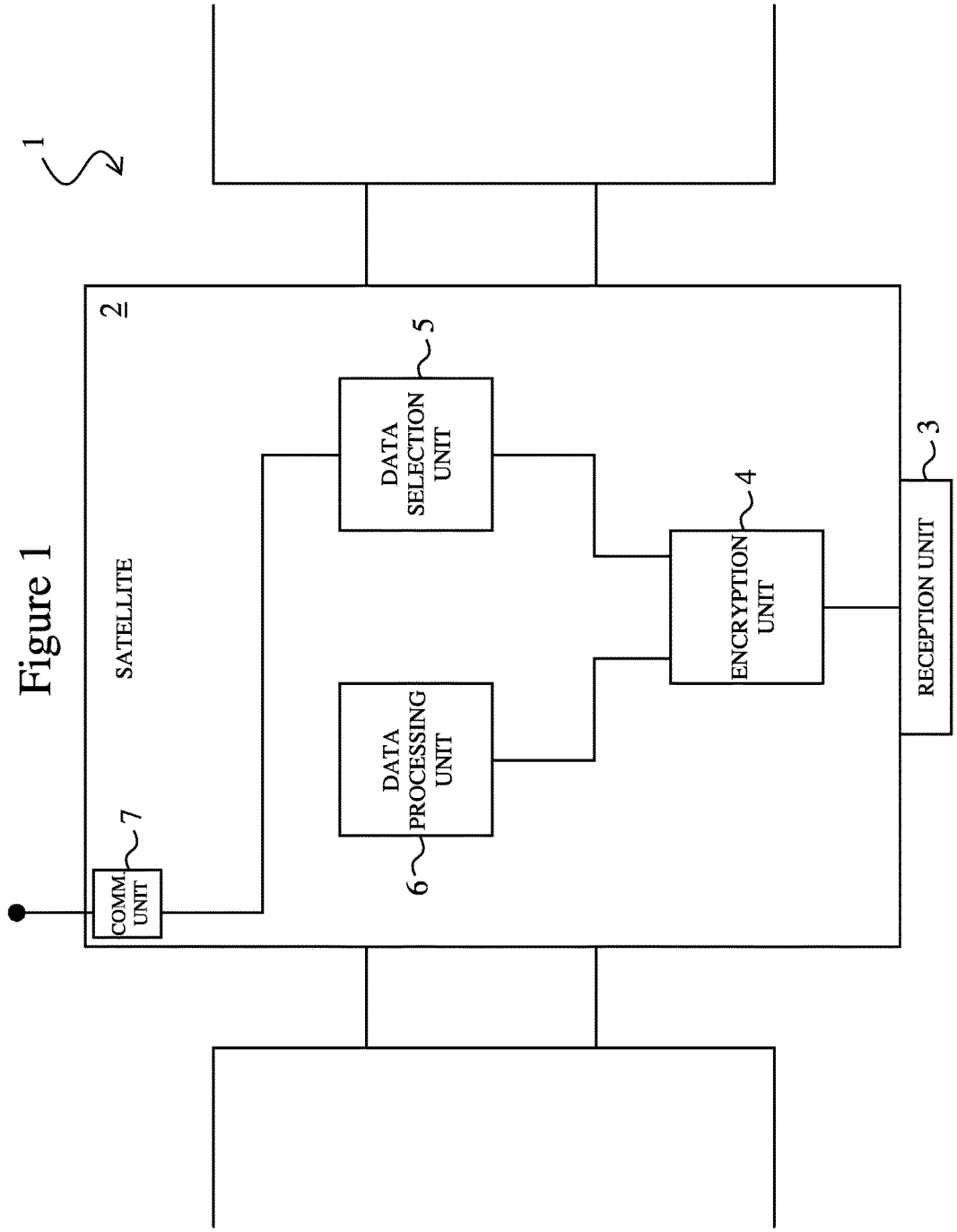
FIG. 1 shows a schematic illustration of a flying object with the relevant units.

FIG. 1 schematically shows the support system 1 with a flying object 2, which in this exemplary embodiment is in the form of a satellite. In this context, satellites have the advantage that firstly they travel on previously stipulated and calculated trajectories, which means that it is possible to ascertain the reception and transmission range of the satellite at any time. Secondly, satellites have the advantage that they are able to cover a very large transmission and/or reception range on account of their corresponding altitude.

The satellite 2 has an AIS transmission and/or reception unit 3 that is oriented in the direction of the earth's surface and therefore forms a transmission range and/or reception range in the direction of the earth's surface. The AIS transmission and/or reception unit 3 is adjoined by an encryption unit 4 that can be used to encrypt AIS messages or shipping traffic data, as a result of which they can be transmitted to the ships in encrypted form by means of the AIS radio signals using the AIS transmission unit 3. The same also applies to the return path, which means that the ships can likewise return their data in encrypted form, said data then being able to be decrypted using the encryption unit 4.

The encryption unit 4 is then adjoined both by a data selection unit 5 and by a data processing unit 6. In this case, the data selection unit 5 is set up to take the position of the AIS transmission range, which is defined from the AIS transmission unit 3 in the direction of the earth's surface, as a basis for selecting the shipping traffic data to be transmitted from a multiplicity of stored shipping traffic data. In this case, the data buffer store can be arranged on the satellite 2 directly or in a ground station (not shown), from where the data can then be retrieved when required.

The data selection unit 5 can now be used to provide the ships with dedicated messages or shipping traffic data that relate to their actual situation. Thus, depending on the position of the transmission range, it is possible to transmit weather data that relate exclusively to the transmission range. It is also conceivable for appropriate territory data, such as water levels, number of free berths and the like, to be transmitted. If the transmission range shifts continuously in one direction, the shipping traffic data to be transmitted can be continuously matched to the changing position.

The data processing unit 6 that is likewise arranged in the satellite 2 is furthermore set up to take received shipping traffic data that have been transmitted by the ships in the reception range of the AIS reception unit 3 as a basis for selecting appropriate shipping traffic data to be transmitted from a multiplicity of shipping traffic data stored in a buffer store. Hence, the information that the ships themselves provide can be taken as a basis for selecting and sending to the ships those data that are also particularly advantageous to said ships. By way of example, it is thus conceivable for the shipping traffic data that are to be transmitted, such as weather information, to be selected using the position data and the direction of travel and also speed of travel, so that the ships can be provided with a predictive overview of the coming weather situation.

Both the data selection unit 5 and the data processing unit 6 are furthermore connected for signaling purposes to a communication unit 7 that can set up a communication link to a ground station (not shown) directly or with the interposition of further satellites or flying objects. Thus, the satellite 2 can be constantly provided with important data that can then be taken into account by the units 5 and 6 in the course of a selection. This allows all ships in international tourism to be provided with appropriate information from a central point, which ships would otherwise be unable to use these data sources as appropriate on account of their distance from relevant communication infrastructure devices. It is therefore possible to reach a large number of ships with such a support system 1.

Figure 2:
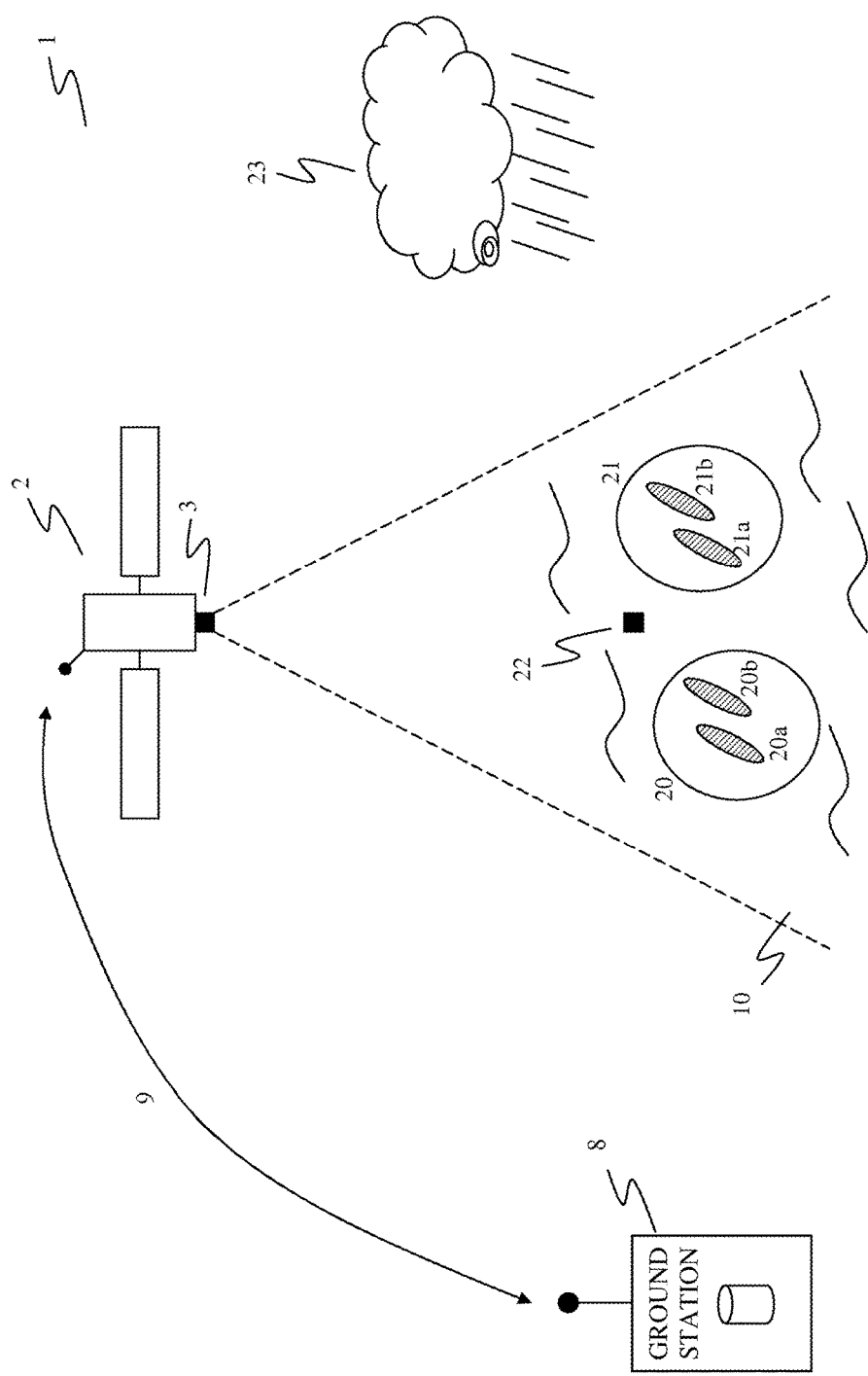
FIG. 2 shows an exemplary application on the high sea.

FIG. 2 shows the support system 1 with the satellite 2 and a ground station 8 in an instance of application. The transmission and/or reception unit 3 is oriented in the direction of the earth's surface and forms a transmission range 10. In the exemplary embodiment in FIG. 2, this AIS transmission range 10 is congruent with the reception range of the transmission and/or reception unit 3.

The transmission range 10 contains four ships that are equipped with AIS technology. In this case, the ships 20a and 20b form a radio cell 20 while the ships 21a and 21b form a second AIS radio cell 21. On account of the distances of the first group of ships 20a and 20b from the second group of ships 21a and 21b, these ships in the respective groups cannot see one another and hence are also unable to interchange data with one another. Instead, the ships are limited to receiving within their radio cell 20 and 21 and the ships located in their respective AIS radio cell 20 and 21 and their data.

In the ground station 8, relevant information from a wide variety of data sources is now collected and conditioned, such as weather information, environmental information, pirate areas, territory data and up-to-date traffic data, such as traffic density in coastal regions or the like. An appropriate communication link 9 is used to transmit these data from the ground station 8 to the satellite 2. In order to cover as large an area as possible, it is naturally conceivable for a large number of such satellites to travel in appropriate orbits, so that these data can be provided for a large number of these satellites or flying objects. For reasons of clarity, only one satellite 2 is shown in this case, however.

In another embodiment, it is conceivable that, instead of satellites, aircraft, such as commercial aircraft, are used, which can then cover a more or less large transmission area at a correspondingly high altitude or cruise altitude.

The shipping traffic data received from the ground station 8 via the communication link 9 are then conditioned as appropriate using the data selection unit such that those shipping traffic data that are relevant to the ships 20a, 20b, 21a, 21b situated in the transmission range 10 are selected for these ships. By way of example, these could be those shipping traffic data that are situated exclusively in the region of the transmission range 10. This is illustrated by way of example with the aid of an iceberg 22 that is situated in the transmission range 10. It is important for the ships in the transmission range 10 to know the position of the iceberg 22. Ships that are a long way outside this transmission range 10, however, and hence are also at a very great distance from these shallows 22, are less interested in being provided with such information, however, which can quickly result in a flood of information.

Furthermore, there is a storm 23 outside the transmission range 10, the position and presence of said storm likewise being filtered by the data selection unit 5 on the satellite, since it is not in the transmission range 10.

However, it is now conceivable for the ships 21a and 21b in the AIS radio cell 21, for example, to be traveling in the direction of this storm, which means that it may be entirely appropriate to this group of ships for the information and knowledge about the storm 23 to be communicated to them, even if said storm is not yet in the transmission range 10. On account of the fact that the ships in the transmission range 10 constantly transmit their own shipping data using the AIS arranged on them, this can be detected by the reception unit 3 on the satellite 2 and can be extracted by the data processing unit 6, as a result of which the position, direction of travel and possibly also speed of the ships in the transmission range 10 can be detected. From this information, it is then possible to derive which ships will possibly encounter the storm 23 outside the transmission range 10.

On account of this data processing, it therefore becomes possible to provide further information or shipping traffic data for the ships in the transmission range 10, which information or data may possible be relevant to some ships in the transmission range 10. The finding in this regard concerning which shipping traffic data may be selected and possibly relevant is ascertained using the data transmitted by the ships themselves, particularly using position and direction-of-travel information.

In addition, such a support system 1 can be used to transmit emergency messages quickly to a large number of ships when there is a strickened ship in the transmission range 10, for example. Even if the ships that could rush to the assistance of the stricken ship are situated outside the transmission range of the stricken ship, the information about the stricken ship can nevertheless be transmitted to the ships using the present support system 1, since the transmission range 10 covers a substantially larger "footprint" than would generally be possible by the individual ships and their AIS radio cells.

The invention claimed is:

1. A support system for traffic support for ships that have AIS ship reception units for receiving AIS radio signals containing shipping traffic data, comprising
at least one flying object that has at least one AIS flying transmission unit that is set up to transmit AIS radio signals containing shipping traffic data within an AIS transmission range such that the transmitted AIS radio signals are received by ships situated within the AIS transmission range by virtue of the respective AIS ship reception units of said ships; and
at least one data selection unit that is configured to select shipping traffic data to be transmitted from a multiplicity of shipping traffic data stored in a data buffer store on the basis of a position of the AIS transmission range of the at least one AIS flying transmission unit and/or a priority of the stored shipping traffic data,
wherein the AIS flying transmission unit is configured to transmit AIS radio signals that contain at least the shipping traffic data selected by the at least one data selection unit.

2. The support system according to claim 1, wherein the at least one flying object has an AIS flying reception unit that is set up to receive AIS radio signals containing shipping traffic data within an AIS reception range, and the support system furthermore comprises a data processing unit that is set up to
extract from the AIS radio signals received by means of the AIS flying reception unit the shipping traffic data contained in said AIS radio signals and
select shipping traffic data to be transmitted from a multiplicity of shipping traffic data stored in a data buffer store on the basis of the shipping traffic data extracted from the received AIS radio signals,
wherein the AIS flying transmission unit is set up to transmit AIS radio signals that contain at least the shipping traffic data selected by the data processing unit.

3. The support system according to claim 1, further comprising at least one AIS encryption unit configured for encrypting at least a portion of the shipping traffic data to be transmitted, and the AIS flying transmission unit is set up to transmit AIS radio signals that contain at least the encrypted shipping traffic data.

4. The support system according to claim 1, wherein the at least one flying object has a reception unit that is configured to receive a confirmation message that has been transmitted by a ship following reception of an AIS message addressed to the ship.

5. The support system according to claim 1, wherein the at least one flying object has a communication unit for sending and/or receiving shipping traffic data to and/or from a ground station or satellite.

6. The support system according to claim 1, wherein the at least one flying object comprises a plurality of flying objects that each have at least one AIS flying transmission unit and/or AIS flying reception unit for transmitting and/or receiving AIS radio signals, wherein the AIS transmission ranges and/or AIS reception ranges of the respective AIS flying transmission units and/or AIS flying reception units together form a common transmission range and/or reception range.

7. A method for traffic support for ships that have AIS ship reception units for receiving AIS radio signals containing shipping traffic data, comprising
transmitting AIS radio signals containing shipping traffic data by an AIS flying transmission unit arranged on a flying object within an AIS transmission range such that the transmitted AIS radio signals are received by ships situated within the AIS transmission range by virtue of the respective AIS ship reception units of said ships; and
selecting, by a data selection unit, shipping traffic data to be transmitted from a multiplicity of shipping traffic data stored in a data buffer store on the basis of a position of the AIS transmission range of the AIS flying transmission unit,
wherein the step of transmitting includes transmission of AIS radio signals which contain at least the shipping traffic data selected by the data selection unit.

8. The method according to claim 7, further comprising the steps of:
receiving, by an AIS flying reception unit arranged on the flying object, AIS radio signals containing shipping traffic data flying object within an AIS reception range,
extracting, by a data processing unit, the shipping traffic data contained in the received AIS radio signals,
selecting, by the data processing unit, shipping traffic data to be transmitted from a multiplicity of shipping traffic data stored in a data buffer store on the basis of the shipping traffic data extracted from the received AIS radio signals, and
transmitting, by the AIS flying transmission unit, AIS radio signals which contain at least the shipping traffic data selected by the data processing unit.

9. The method according to claim 7, further comprising encrypting, by an encryption unit, at least a portion of the shipping traffic data to be transmitted and transmitting, by the AIS flying transmission unit, AIS radio signals which contain at least the encrypted shipping traffic data.

10. The method according to claim 7, further comprising transmitting, by the AIS flying transmission unit, AIS radio signals which contain at least one AIS message addressed to a particular ship as shipping traffic data and receiving, by a reception unit arranged on the flying object, a confirmation message transmitted by the relevant ship when the relevant ship has received the AIS message.

11. The method according to claim 7, further comprising transmitting, by a communication unit arranged on the flying object, received shipping traffic data to a ground station and/or receiving, by the communication unit, shipping traffic data from a ground station directly or by using intermediate stations.

* * * * *